United States Patent [19]
Campi

[11] Patent Number: 5,689,357
[45] Date of Patent: Nov. 18, 1997

[54] NONLINEAR OPTICAL ELEMENT FOR EXTREMELY HIGH BIT RATES

[75] Inventor: Domenico Campi, Turin, Italy

[73] Assignee: Cselt- Centro Studi e Laboratori Telecomunicazioni S.p.A., Turin, Italy

[21] Appl. No.: 531,852

[22] Filed: Sep. 21, 1995

[30] Foreign Application Priority Data

Dec. 23, 1994 [IT] Italy ................................ TO94A1064

[51] Int. Cl.$^6$ ........................... H01L 27/14; G02F 1/015; G02F 1/23
[52] U.S. Cl. ................... 359/245; 257/17; 257/21
[58] Field of Search .................. 257/17, 21, 22; 332/177; 330/4.6, 4.9; 359/245

[56] References Cited

U.S. PATENT DOCUMENTS

| | | | |
|---|---|---|---|
| 4,957,337 | 9/1990 | Ogawa et al. | 257/17 |
| 5,160,993 | 11/1992 | Ishikawa et al. | 359/248 |
| 5,175,739 | 12/1992 | Takeuchi et al. | 372/45 |
| 5,191,630 | 3/1993 | Tajima | 359/326 |
| 5,216,261 | 6/1993 | Inata et al. | 359/248 |
| 5,436,756 | 7/1995 | Knox et al. | 359/260 |

OTHER PUBLICATIONS

Vaterlein et al, J. Appl. Physi., vol. 76, #2, pp. 1184–1186, Jul. 15, 1994; abst. only herewith.

Campi et al, Proc. SPIE, vol. 2150, pp. 72–83, Jan. 24, 1994; abst. only herewith.

Campi et al, CSELT Tech. Rep (Italy), vol. 21, #4, pp. 727–740, Oct. 1993; abst. only herewith.

Tacheevelir et al, Surf. Sci (Netherlands), vol. 267, #1–3, pp. 267–269, Apr. 21, 1992; abst. only herewith.

"130 PS Recovery of All–Optical Switching in a GaAs Multiquantum Well Directional Coupler", P.LikamWa et al, Applied Physics Letters, vol.58,No.19, 3 May 1991, pp.2055–2057.

"Femtosecond Dynamics of the Nonlinear Index Near the Band Edge in AlGaAs Wavwguides", K.K. Anderson et al, Applied Physics Letters, vol.56, No.19, 7 May 1991, pp.1834–1836.

"Mode Locking of Semiconductor Diode Lasers Using Saturable Excitonic Nonlinearities", P.W.Smith et al, Journal of the Optical Society of America, vol.2, No.7, Jul. 1985, pp. 1228–1236.

*Primary Examiner*—Nelson Moskowitz
*Attorney, Agent, or Firm*—Herbert Dubno

[57] ABSTRACT

The nonlinear optical element for extremely high bit rates comprises a plate made of semiconductor material, in which is there is realized a sequence of variously doped layers, which can be passed through, in operation, by one or more light radiations. The element comprises a sequence of structures which exhibit excitonic nonlinearities, and which are placed geometrically close to layers of larger sizes, which act as dilution/recombination tanks for the carriers eliminated by the nonlinear structures. The element allows realization of optical devices, such as memories, directional couplers, switches, etc., in which fast excitonic nonlinearity is very evident and in which carriers are eliminated in time intervals of 1 to 10 ps, so that the devices are able to function at extremely high bit rates. (FIG. 1 )

8 Claims, 2 Drawing Sheets

NONLINEAR OPTICAL ELEMENT FOR EXTREMELY HIGH BIT RATES

SPECIFICATION

1. Field of the Invention

The present invention relates to telecommunications which use light radiations as an information carrier and, in particularly, to a nonlinear optical element for extremely high bit rates.

2. Background of the Invention

Modern optical telecommunications systems use both opto-electronic devices, such as lasers and optical amplifiers, and electro-optical devices, such as modulators and switching matrices, which are able to operate satisfactorily at bit rates up to the order of a few Gbits/s.

However, serious difficulties, stemming from the "electrical" nature of the present devices, are encountered if operation at higher bit rates is required. Today's technology does not allow obtaining electro-optical devices with capacitance, between the piloting electrodes, of less than a few fractions of a picofarad, and this brings the cut-off frequency, determined by the time constant RC of the devices, to values which cannot exceed the aforementioned bit rates.

Also opto-electronic devices have limitations in terms of operation speeds, due to the fact that they cannot be modulated directly at frequencies higher than a few GHz, as this would require the cavity to be depleted and filled with charge carriers at transit speeds which cannot be reached practically.

On the other hand, it can be foreseen even now that future systems will require very high bit rates, of the order of hundreds of Gbit/s, in order to be able to provide wide band multimedia services on a large scale. Much faster systems will therefore be required, which can only be made with devices with full optical control. In effect, in electro-optical or opto-electronic devices, the variations in the parameters defining the transfer function are obtained by means of an electrical control (either in voltage or in current), whereas in optically controlled devices the same variations are obtained through amplitude variations of the light signal transiting through the device. These variations can be carried out at extremely high bit rates.

The operation of optically controlled devices is based on the use of nonlinear optical materials, i.e. materials whose optical properties depend on the intensity of light radiation. Many materials, such as glasses, polymers, crystals, etc., exhibit optical non-linearity. However, to obtain marked non-linearity effects at wavelengths compatible with those utilized for telecommunications, it is necessary to use particular semiconductor structures, called multiquantum well hetero-structures. Use of such structures also allows monolithic integration of the nonlinear optical elements with other devices necessary for the realization of the transmission systems.

In general, the optical properties of semiconductors and, in particular, those of quantum well hetero-structures, depend on the density of the carriers present inside them. By sending into such structures a light radiation at a wavelength which is completely or partly absorbed, photo-generation of electron-hole pairs is caused, said pairs being free or linked through a Coulombic-type of interaction, In the latter case the generated pairs, called excitons, are hydrogenoid-type systems formed by an electron and a hole, which, in materials with quantum confinement, decay in a few hundreds femtoseconds.

This transient behavior can be exploited to construct nonlinear optical elements operating at extremely high bit rates, of the order of 100 Gbit/s.

Unfortunately, when they break due to collisions with phonons, excitons give rise to free electron-hole pairs. These electron-hole pairs in turn bring about less intense optical nonlinearities, which normally decay on relatively long time scales by elimination of the carriers from the structure, for instance though radiative de-excitation. In the most commonly used semiconductors, this phenomenon occurs in an interval of 1 to 10 ns, which is too long to allow effective applications in the field of optical telecommunications.

Some methods to eliminate carriers from the structure in shorter times are already known.

A first method is described in the paper "130 ps recovery of all-optical switching in a GaAs multiquantum well directional coupler", by P. LiKamWa et al., Applied Physics Letters, Vol. 58, No. 19, 3 May 1991, pp. 2055–2057. The method consists in applying electrical fields to sweep out carriers and use them in an electrical circuit, over time intervals of the order of 100 ps. This method is complex due to the presence of electrodes. Actually, the electrodes absorb energy from the optical signal and heat up, causing nonlinear effects of a thermal origin, which are in competition with the excitonic/electronic effects and are very slow (in the µs time scale). This fact is particularly evident when guided geometry devices are utilized, because the light lost in the coupling irradiates the electrodes.

Another method is described in the paper "Femtosecond dynamics of the nonlinear index near the band edge in AlGaAs waveguides", by K. K. Anderson etal., Applied Physics Letters, Vol. 56, No. 19, 7 May 1990, pp. 1834–1836. The method envisages, only for guiding devices, diffusing the carriers outside the nonlinear zone or, in any case, outside the guiding zone of the device.

A further method, described in the paper "Mode locking of semiconductor diode lasers using saturable excitonic nonlinearities", by P. W. Smith et al., Journal of the Optical Society of America, Vol. 2, No. 7, July 1995, obtains non-radiative recombination of the carriers en crystallographic damage centers induced by means of ionic implantation, for instance implantation of protons in doses of about $10^{12}$ cm$^{-2}$. Recombinations are obtained with time constants of about 100 ps, but the nonlinear effects that can be obtained turn are degraded to some extent because of the crystallographic damage induced in the semiconductor structure as a result of the implantation.

None of the above methods can operate on time scales shorter than 100 ps, and therefore none of them allows full exploitation of nonlinearities which occur on time scales 1000 times faster.

OBJECT OF THE INVENTION

It is an object of the invention to provide an improved nonlinear optical element which can be used in optical devices, such as memories, directional couplers, switches, etc., in which fast excitonic nonlinearity is very pronounced and in which carriers are eliminated in time intervals of 1 to 10 ps, thus enabling it to operate at extremely high bit rates.

SUMMARY OF THE INVENTION

More particularly the present invention provides a nonlinear optical element for extremely high bit rates, comprising a plate made of semiconductor material in which a sequence of variously doped layers is realized, through which layers one or more light radiations can be made to pass in operation. According to the invention the device comprises a sequence of structures which exhibit excitonic nonlinearities and which are placed geometrically close to layers of larger sizes, which act as dilution/recombination tanks for the carriers eliminated by the nonlinear structures, these structures comprising a first quantum well delimited by confinement layers and said larger size layers being second quantum wells.

BRIEF DESCRIPTION OF THE DRAWING

The above and other objects, features, and advantages will become more readily apparent from the following description, reference being made to the accompanying drawing in which.

SPECIFIC DESCRIPTION

The optical element consists of a plate of semiconductor material in which a sequence of variously doped layers is manufactured and through which layers, in operation, one or more light radiations are made to pass. In particular, the optical element comprises a sequence of structures exhibiting excitonic nonlinearities, placed geometrically close to layers of larger sizes, which act as a dilution/recombination tank for the carriers eliminated by the nonlinear structures. The larger size layers must:

exhibit no excitonic nonlinearities and have reduced carrier nonlinearities;

allow carriers to move there rapidly, by inducing negligible nonlinear effects; and avoid the photo-generation of carriers.

The mechanism of carrier transfer from the nonlinear structure to the dilution/recombination tank is resonance tunneling through the potential barrier separating the two parts, which phenomenon occurs on the picosecond scale and is widely tunable depending upon the height and spatial extension of the potential barrier.

The transfer is due to the difference in carrier density between the nonlinear structure, in which the carriers are initially photo-generated, and the tank, initially empty.

In synthesis, the following sequence of phenomena occurs in the element:

1) excitons, photo-generated by resonance, cause a fast nonlinearity and quickly break up, originating carriers in about 200 fs;

2) in comparable times, the carriers tend to reach a quasi-equilibrium situation within the nonlinear structure, establishing a Fermi quasi-level; and 3) since the Fermi level in the dilution layer is much lower, the energy difference between levels causes diffusion from the nonlinear structure to the tank layer by means of tunneling through the barrier.

Figure 1:
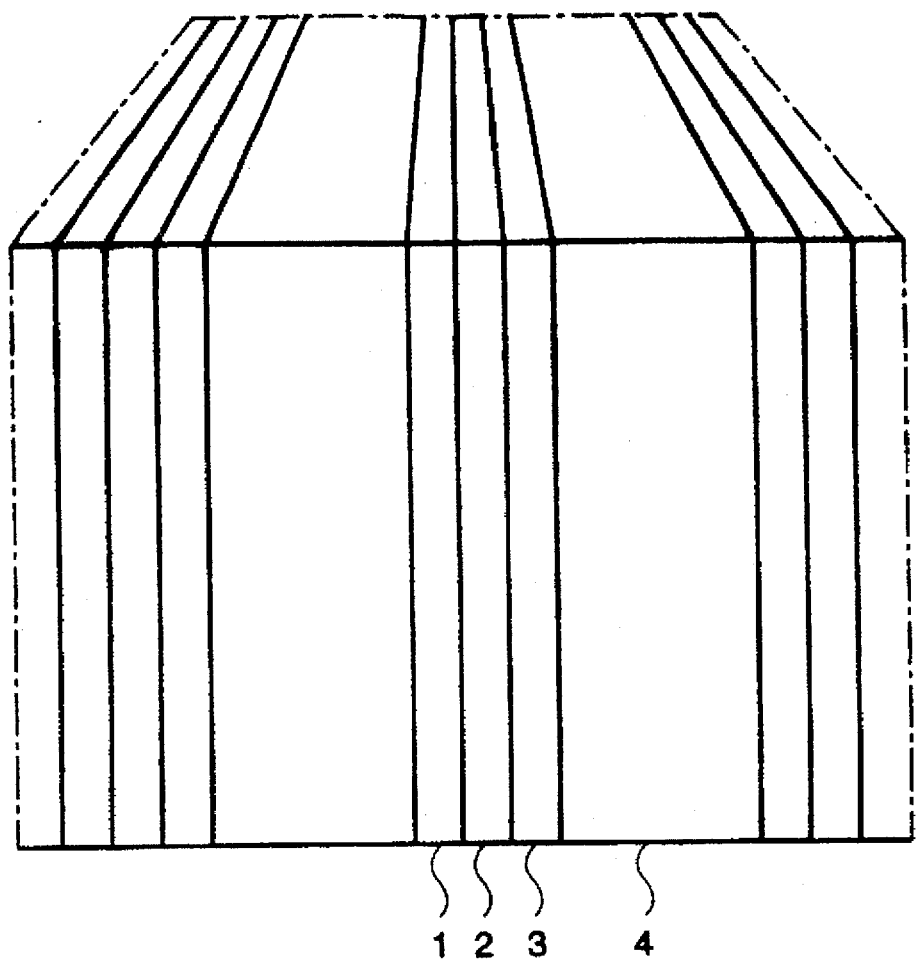
FIG. 1 is a diagrammatic perspective view which the sequence of semiconductor layers making up the nonlinear optical element.

FIG. 1 shows the sequence of semiconductor layers, differing in sizes and chemical compositions, which make up the nonlinear optical element.

The operating characteristics described above are obtained through an appropriate choice of chemical composition and thickness of the tank layer. In particular, a larger thickness enables to obtain minimum confinement effects or no confinement effect. Moreover, the optical threshold of the tank layer is at higher energy than in the nonlinear structure, so it does not contribute to nonlinearity and, above all, it does not contribute to the device losses.

In order that the above situation actually occurs, the tank layer material must be of excellent crystallographic and optical quality. Otherwise, there would be widening effects at the absorption edge, which would cause losses.

In FIG. 1, layers 1 and 3 are two layers of InP, about 5 nm thick, layer 2 is a layer of InGaAs, about 5 nm thick, and layer 4 is a layer of InGaAsP, about 20 nm thick. Layers 1, 2 and 3 constitute the structure that presents excitonic nonlinearities, while layer 4 is the layer acting as a dilution/recombination tank. Layers 2 and 4 form quantum wells of different sizes, while layers I and 3 form confinement layers.

The tank layer must be made of a different material from the nonlinear structure, in order to obtain the alignment of conduction band levels and therefore to make easy the transfer by tunneling and the tank filling.

Actually, after tunneling, the Fermi quasi-level will be aligned along the entire structure. If the tank layer levels were excessively higher, they would not become filled efficiently.

Figure 2:
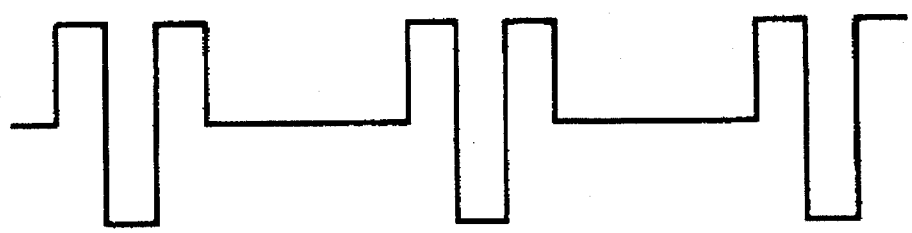
FIG. 2 is a graph of the conduction band potential profile relevant to the layer sequence in FIG. 1.

FIG. 2 shows the conduction band potential profile relevant to the sequence of layers in FIG. 1.

In order to accomplish the transfer by tunneling, without interference with the optical operation, it is necessary that, 1) the lower electron energy levels of the nonlinear structure and the tank layer energy level are aligned within a few meV. This requirement is particularly stringent for the valence band (heavy hole levels);

2) with respect to optical properties this causes the energy gap of the nonlinear structure to be equal to that of the tank layer; and 3) the energy of the photons of the optical signal, to be processed through the structure, is high enough to cause the photo-generation of excitons in the nonlinear structure and low enough not to generate appreciable quantities of carriers both in the nonlinear structure and in the tank layer.

In practice, the optical element can be realized by placing together quantum wells of different size and/or composition and it can also be utilized in integrated optical circuits. Moreover, the tank layer may be doped in such a way as to induce in it nonradiative recombination centers, through which the accumulated carriers can be eliminated in time intervals of about 10 ps. This can be obtained, for example, by doping such layer with transition elements, such as Fe or Co.

Figure 3:
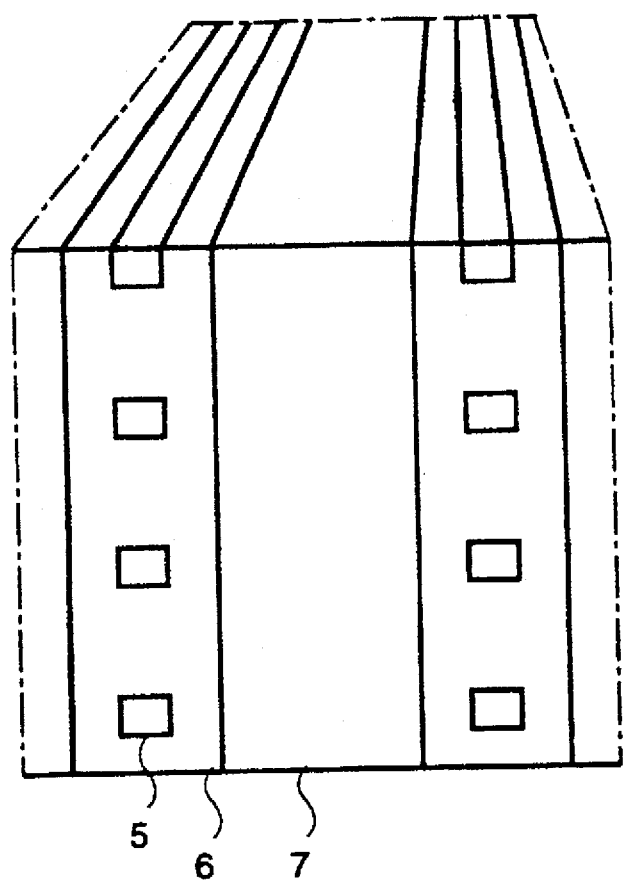
FIG. 3 is a view similar to FIG. 1 of another embodiment of the optical element.

Another exemplary embodiment of the optical element is shown in FIG. 3. This is a particularly advantageous solution, as it allows the carriers to be diluted very efficiently. It comprises nonlinear structures based on quantum wires, indicated by 5, and on confinement layers, indicated by 6, as well as tank layers, which can be quantum holes or wells, indicated by 7. The cross-sectional dimensions of the quantum wires shown in the Figure can be about 5 nm in height and 5–10 nm in width.

Another favorable aspect of this embodiment is that the bonding energy of the excitons in the quantum wires is particularly high as an effect of increased confinement. This makes it simpler to meet the constraint on the photon energy, illustrated above.

The practical manufacture of the optical elements occurs as follows:

1) forming a sequence of quantum wells, of suitable composition, by alternating a layer of low band-gap nonlinear material, e.g. InGaAs, a high band-gap layer, e.g. InP, a medium band-gap layer, e.g. InGaAsP, to realise a tank, and then forming similar sequences;

2) defining lateral nano-geometries on the surface of the sample by EBL (Electron Beam Lithography);

3) attacking the structure up to the substrate, or the buffer layer, in accordance with the ECR-RIE (Electron Cyclotron Resonant-Reactive Ion Etching) technique; and 4) growing again the materials by suitable epitaxial techniques, taking care to grow again the quaternary material and the InP barriers in planar shape. InP is grown again around the quantum wires, in accordance with the outline in FIG. 3.

It is evident that what has been described is provided solely by way of a non-limiting example. Variations and modifications are possible without departing from the scope of the invention.

I claim:

1. A nonlinear optical element for extremely high bit rates, comprising a plate of semiconductor material formed with a sequence of variously doped layers through which at least one light radiation passes, said doped layers comprising a sequence of structures with excitonic nonlinearities and geometrically close to layers of larger sizes, which act as dilution/recombination tanks for carriers eliminated by the structures of excitonic nonlinearities, said structures being composed of a first quantum well delimited by confinement layers and said layers of larger sizes being second quantum wells, the layers of larger sizes having higher energy optical thresholds than the layers of said structures of excitonic nonlinearities.

2. The nonlinear optical element defined in claim 1, wherein said first quantum well is a layer of InGaAs about 5 nm thick.

3. The nonlinear optical element defined in claim 1, wherein said first quantum well is a wire of InGaAs with cross sectional dimensions sizes of about 5 nm in height by 5–10 nm in width.

4. The nonlinear optical element defined in claim 1, wherein said second quantum wells are made of InGaAsP and are about 20 nm thick.

5. The nonlinear optical element defined in claim 1, wherein said confinement layers are made of InP and are about 5 nm thick.

6. The nonlinear optical element defined in claim 1 wherein said second quantum wells are doped with transition elements.

7. The nonlinear optical element defined in claim 6 wherein said confinement layers are made of InP and are about 5 nm thick, said transition metals are Fe and Co, said second quantum wells are made of InGaAsP and are about 20 nm thick and said first quantum well is composed of InGaAs.

8. A nonlinear optical element for extremely high bit rates, comprising a plate of semiconductor material formed with a sequence of variously doped layers traversed by light radiation, said layers being comprised of a sequence of structures which exhibit excitonic nonlinearities geometrically close to layers of larger sizes which act as dilution/recombination tanks for carriers eliminated by the structures, said structures being composed of a first quantum well delimited by confinement layers and said layers of larger sizes being second quantum wells, said first and second quantum wells are made of different materials such that lower electron energy levels in said structures which exhibit excitonic nonlinearities are substantially aligned with the energy of the tank layers and an optical threshold of the tank layers is at a higher energy than that of the structures which exhibit excitonic nonlinearities.

* * * * *